US006745231B1

(12) United States Patent
Megiddo

(10) Patent No.: US 6,745,231 B1
(45) Date of Patent: Jun. 1, 2004

(54) SYSTEM FOR SECURING ELECTRONIC MAIL

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 09/634,547

(22) Filed: Aug. 8, 2000

(51) Int. Cl.[7] .............................. G06F 15/16; H04L 9/00
(52) U.S. Cl. ........................ 709/206; 713/200; 713/201; 713/153; 380/255; 380/268
(58) Field of Search ............................ 709/206, 238; 713/200, 201, 151, 152, 153; 380/33, 28, 255, 268

(56) References Cited

U.S. PATENT DOCUMENTS

| 4,802,220 | A | | 1/1989 | Marker, Jr. ................... 380/33 |
| 4,897,854 | A | | 1/1990 | Harris et al. ................... 375/17 |
| 5,392,071 | A | | 2/1995 | Richards et al. ............. 348/398 |
| 5,495,606 | A | | 2/1996 | Borden et al. ............... 395/600 |
| 5,794,207 | A | * | 8/1998 | Walker et al. .................. 705/1 |
| 5,822,433 | A | * | 10/1998 | Bottle et al. ................. 713/155 |
| 5,848,161 | A | * | 12/1998 | Luneau et al. ................ 705/78 |
| 5,884,496 | A | | 3/1999 | Kim et al. ..................... 62/186 |
| 5,995,939 | A | * | 11/1999 | Berman et al. ................. 705/3 |
| 6,021,307 | A | * | 2/2000 | Chan .......................... 725/110 |
| 6,199,165 | B1 | * | 3/2001 | Grunner ..................... 713/201 |
| 6,246,767 | B1 | * | 6/2001 | Akins et al. ................. 380/210 |
| 6,249,808 | B1 | * | 6/2001 | Seshadri ..................... 709/206 |
| 6,289,105 | B1 | * | 9/2001 | Murota ....................... 380/286 |
| 6,377,690 | B1 | * | 4/2002 | Witschorik | |
| 6,415,032 | B1 | * | 7/2002 | Doland ........................ 380/255 |
| 6,442,686 | B1 | * | 8/2002 | McArdle et al. ............. 713/151 |
| 6,473,860 | B1 | * | 10/2002 | Chan ........................... 713/193 |
| 6,499,108 | B1 | * | 12/2002 | Johnson ....................... 713/201 |
| 6,584,564 | B2 | * | 6/2003 | Olkin et al. .................. 713/152 |
| 2002/0154631 | A1 | * | 10/2002 | Makansi et al. ............. 370/389 |
| 2003/0167314 | A1 | * | 9/2003 | Gilbert et al. ............... 709/217 |

FOREIGN PATENT DOCUMENTS

WO    WO 99/34547    *  7/1999    ............ H04K/1/10

OTHER PUBLICATIONS

Anonymous, "Experiment," Sep. 1997, from www.cs.brown.edu/courses/cs007/labs/lab3/lab3.pdf, pp. 64150321–10.*
Denning, Cryptography and Data Security, 1982, Addison–Wesley Publishing Company, pp. 178–181.*
Ajtai et al., "Improved Algorithms and Analysis for Secretary Problems and Generalizations," IEEE 1995, pp. 473–482.*

* cited by examiner

*Primary Examiner*—Dung C. Dinh
*Assistant Examiner*—Bradley Edelman
(74) *Attorney, Agent, or Firm*—Lacasse & Associates; Randy W. Lacasse; Mark McSwain

(57) ABSTRACT

Encrypted e-mails that reside in e-mail service providers servers or a gateway machines can be compromised and deciphered with advances in technology for breaking encryption codes. Significant security can be achieved by encrypting the message, splitting message, and transmitting the individual fragments via a set of unique e-mail servers. At the receivers end, the message can be reconstructed from the individual pieces and then decrypted and displayed to the recipient.

18 Claims, 8 Drawing Sheets

SYSTEM FOR SECURING ELECTRONIC MAIL

BACKGROUND OF THE INVENTION

1. Field of Invention

The present invention relates generally to the field of e-mail security. More specifically, the present invention is related to a method and a system which use message splitting and allow sending and receiving of e-mails with an added level of protection.

2. Discussion of Prior Art

A commonly used resource in the field of communication is electronic mail or 'e-mail'. Computer networks allow users in a local area network (LAN) or a wide area network (WAN), for example, to communicate with one another using e-mail. E-mail messages usually contain text, but in addition can also have various types of file attachments. It will be understood by those skilled in the art that e-mail messages, although usually mentioned in the textual sense, can easily be extended to encompass video, images, voices, etc.

Senders and receivers of electronic mail rely on mail servers and gateways for processing the mail in-text format. Mail messages are stored, at least temporarily, on several machines and can be accessed by strangers. Free electronic mail service is offered by numerous companies with no guarantees. Electronic mail users who are concerned about privacy can encrypt the mail they send and ask that mail sent to them also be encrypted. But, most encryption techniques rely on the fact that the current hardware capabilities restrict an intruder from breaking the code. Mail servers can, in theory, save encrypted mail in their storage devices indefinitely until the technology enables breaking the code, i.e. discovering the key that was used for encrypting the mail. In particular, mail that was encrypted with a 40-bit key several years ago and has been kept by a server or a gateway machine, can now be deciphered. An even more severe problem is created if a decryption key is compromised for any reason, resulting in a large number of encrypted messages becoming exposed. To combat this problem, some existing systems rely on a third trusted party. But, most e-mail service providers (EMSP's), as discussed below, encrypt e-mail optionally and thereby leave open the possibility of compromising security.

FIG. 1 illustrates a typical prior art Internet e-mail security system. In this configuration, a user (user A) who wants to send an e-mail to another user (user B) starts out first by connecting to the Internet 102 via their PC 100. Next, user A logs on to the E-Mail service provider or $EMSP_A$ (denoted $EMSP_A$ for E-Mail Service Provider for user A) 104 and types in the message. Finally, when user A directs the $EMSP_A$ to deliver the message, the $EMSP_A$ forwards it to the domain representative of the recipient. Optionally, the $EMSP_A$ may encrypt the message to be sent.

At the receiving end, the EMSP of user B or $EMSP_B$ 106 receives the e-mail message sent to them by user A and performs a decryption on the message. Whenever user B connects to the Internet 102 (via PC 108) and tries to access e-mail via $EMSP_B$ 106 they are shown their new e-mail from user A. There is always a possibility that the EMSP of both user A and user B are identical and in that instance, the step of forwarding e-mail to another EMSP ($EMSP_B$ 106 in this instance) is eliminated.

One problem with the prior art described above is the existence of technology enabling an intruder to break the code by discovering the key that was used for encrypting the e-mail. Therefore, there is clearly a need for a transparent system that would protects the privacy of e-mail users.

The following references describe prior art in the field of electronic mail and security. The prior art described below is very similar to the system described by FIG. 1, but none relate to the present invention's method and system of splitting of messages in an e-mail environment.

U.S. Pat. No. 4,802,220 describes a method and apparatus for multi-channel communication security. The patent provides secure communication terminal adapters in conjunction with user terminals for splitting and recombining of private communications together with control services in an integrated services digital network (ISDN). The patent however, fails to mention encryption and security in an e-mail environment.

U.S. Pat. No. 4,897,854 provides for an alternative pulse inversion encoding scheme for serial data transmission. Data transmission includes splitting of data into first and second streams and combining them with a different polarity. The patent does not explicitly describe either encryption or an e-mail environment in which splitting of data occurs.

U.S. Pat. No. 5,392,071 teaches an apparatus and method for processing data. Processing of image data is accomplished by passing the data through a splitter into a plurality of streams which are combined to form an output stream.

U.S. Pat. No. 5,495,606 discloses a system for parallel processing of complex read-only database queries using master and slave central processor complexes. Borden et al. describe a query processing system which includes a splitter/scheduler which splits query elements and recombines the results for transmission to the processor.

U.S. Pat. No. 5,884,496 relates to a cool air feeding system for refrigerator. Kim et al. describe a transmission system in which the information is divided into groups of identification information and function information which are combined by the receiver.

In all the above described systems there is no mention of using splitting techniques for sending encrypted e-mail and as mentioned earlier, present e-mail techniques are limited by encryption and security codes that are subject to be compromised with advances in technology. Whatever the precise merits, features and advantages of the above cited references, none of them achieve or fulfill the purposes of the present invention. The current invention reduces the opportunity of an intruder to break the encryption codes to read another user's e-mail. This is accomplished by encrypting and splitting the e-mail into multiple messages; and transmitting each encrypted message through a unique EMSP. These and other objects are achieved by the detailed description that follows.

SUMMARY OF THE INVENTION

The present invention provides for a system for secure e-mail messaging. The invention uses message splitting and allows sending and receiving of e-mails with a measure of protection to the users who have installed it. Hence, the current system reduces the chances an intruder can compromise the encryption codes and read another user's e-mail.

The method and a system comprises a plurality of steps, one or more said steps implemented locally or remotely across a network, wherein said system or steps of the system resides locally or remotely with the exclusion of the e-mail service provider. Encrypted e-mail to be sent is then broken into at least two fragments and the individual entities of the e-mail are then forwarded to the recipient via at least two unique e-mail service providers. At the receiving end, the system reconstructs and decrypts the original message from the individual pieces of e-mail so that the recipient can read the message. An intruder who just has knowledge of any one of the individual pieces of e-mail cannot decipher the message since the present invention makes it necessary for one to have all the pieces of the split e-mail to be able to decrypt and read it.

DESCRIPTION OF THE PREFERRED EMBODIMENTS

Figure 1:
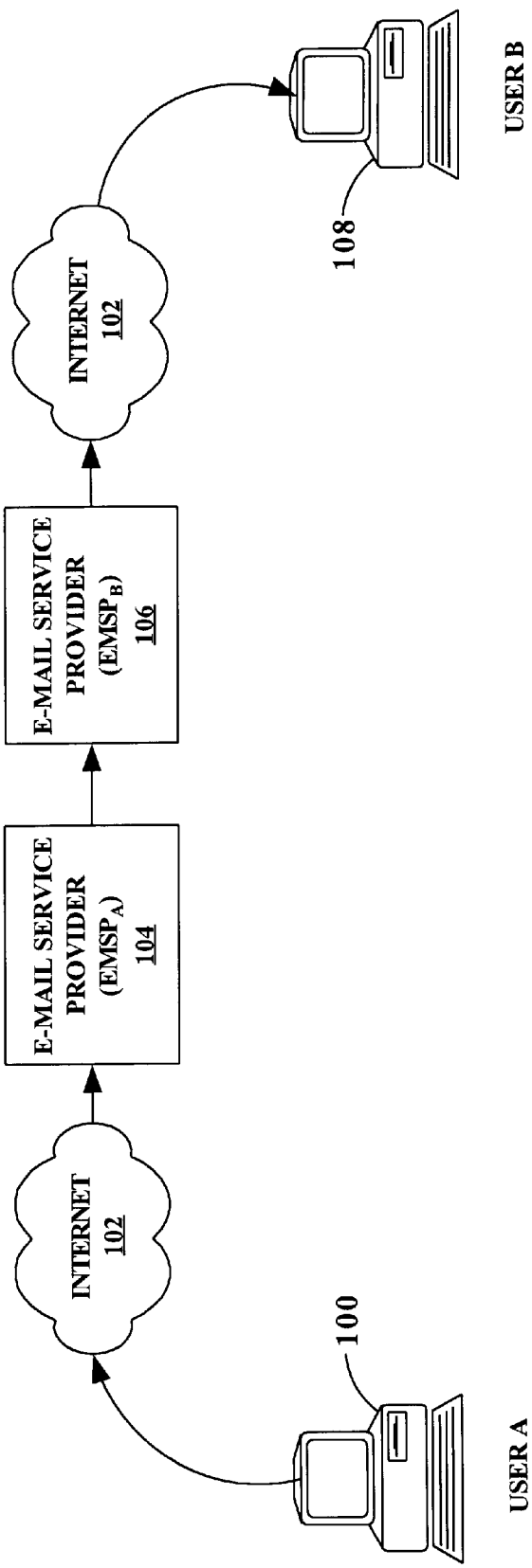
FIG. 1 illustrates prior art Internet e-mail systems.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 2:
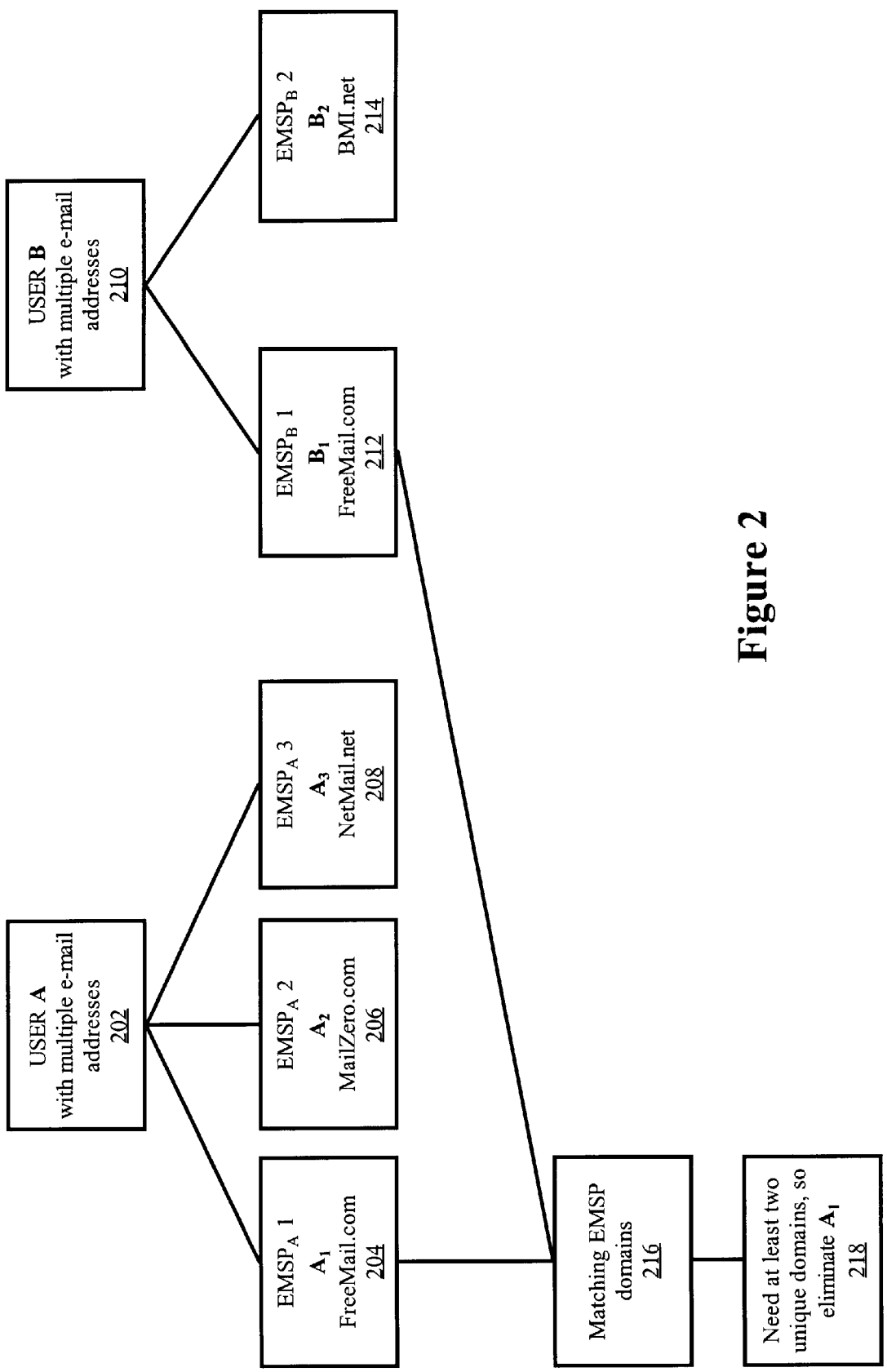
FIG. 2 illustrates an example for picking unique EMSP domains.

A fundamental aspect of the invention, as illustrated in FIG. 2, is that each user maintains e-mail accounts with at least two independent e-mail service providers or EMSP's. This requirement guarantees that as long as EMSPs do not collude (i.e, their domains do not match, nor do the EMSPs share their systems in any way), they cannot decrypt the protected mail that they have handled. If a user does not trust a single Internet Service Provider (ISP), then multiple ISP's can likewise be utilized (especially since several such services are now free). In one embodiment, the system is installed on each user's machine and can open e-mail accounts for the user with several EMSP's. As an alternative embodiment, the system or steps of the system can also be accessed (either in part or full) locally or remotely with the exclusion of the EMSP's.

As a first step, the system tries to identify at least two unique e-mail domains (per user) which the sender and the recipient can access. In this example, associated with user A 202 are three e-mail domains: domain $A_1$—FreeMail.com 204 through $EMSP_A$ 1, domain $A_2$—Mailzero.com 206 through $EMSP_A$ 2, and domain $A_3$—NetMail.net 208 through $EMSP_A$ 3. Associated with User B 210 are two e-mail domains: domain $B_1$—Freemail.com® 212 through $EMSP_B$ 1 and domain $B_2$—BMI.net 214 through $EMSP_B$ 2.

In step 216, the system matches any EMSP domains that are common to the sender and the recipient. In this example, domain $A_1$ (FreeMail.com®) is common to both users A and B. In the preferred embodiment, the system would prefer to pick $A_2$ and $A_3$ and not $A_1$, since $B_1$ is on the same domain as $A_1$. The system eliminates 218 domain $A_1$ (FreeMail.com®) in user A's list to provide each of the users with a pair of unique e-mail addresses: $A_2$ and $A_3$ for User A and $B_1$ and $B_2$ for user B.

Figure 3:
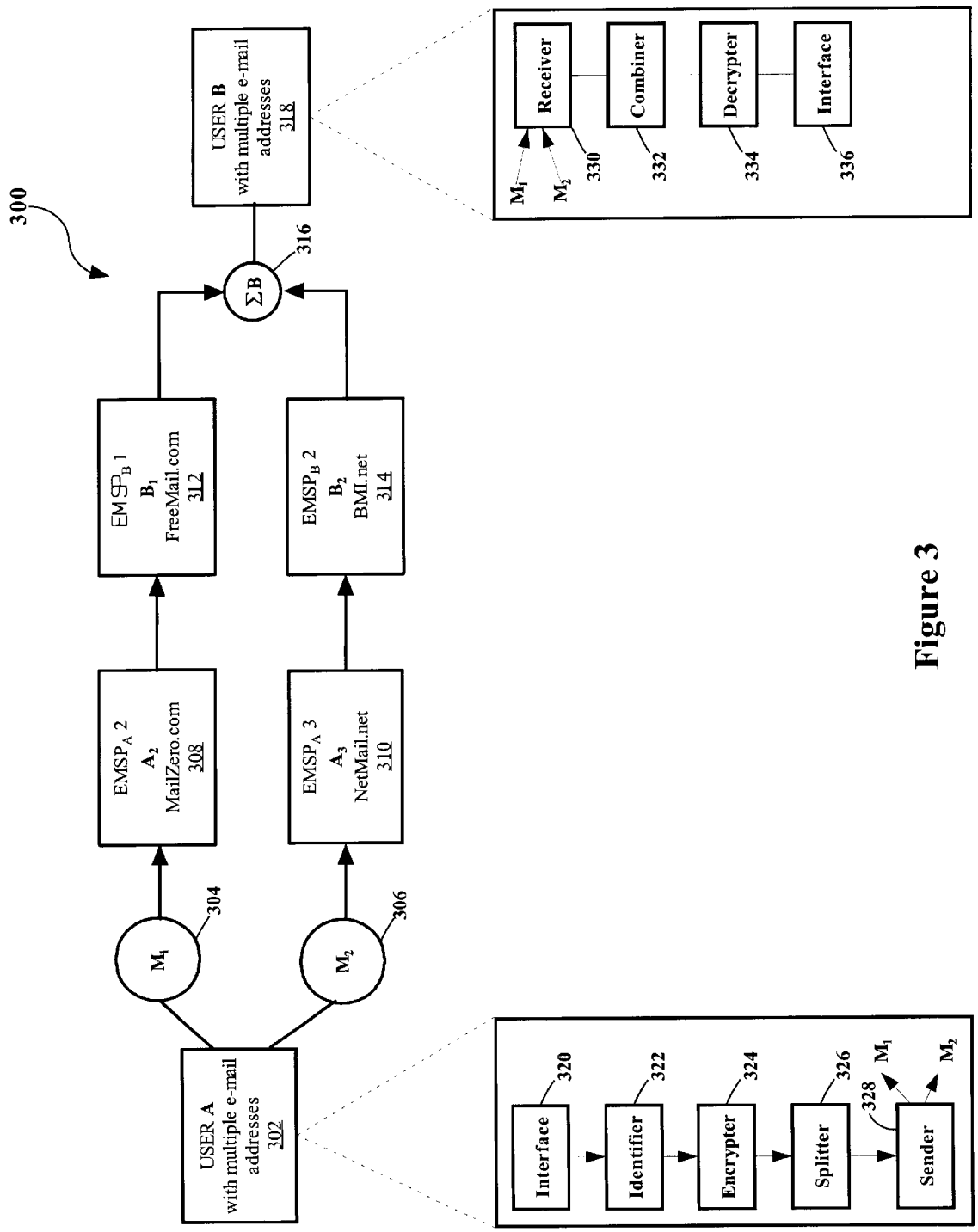
FIG. 3 illustrates the present invention's architecture for sending/receiving secure e-mail by splitting the message into two pieces.

FIG. 3 illustrates the architecture 300 of the present invention for sending/receiving secure e-mail by splitting the message into two pieces. At the sender's end, the system comprises an interface 320 for receiving entered textual message(s), an identifier 322 for identifying at least two unique e-mail domains associated with each of a sender and a recipient, an encryptor 324 to encrypt the message, a splitter 326 for splitting the message, and a sender 328 for sending the individual fragments via two or more unique EMSP's. The system, resident in user A's 302 PC, splits the outgoing e-mail message into two pieces $M_1$ 304 and $M_2$ 306. The system then sends the two e-mail messages, message $M_1$ 304 from $A_2$ 308 to $B_1$ 312 and message $M_2$ 306 from $A_3$ 310 to $B_2$ 314. Each message fails to make logical sense unless they are combined by the receiver B 316. At the receiver's end, the system comprises of a receiver 330 for receiving said fragments of e-mail, a combiner 332 for combining the fragments, a decryptor 334 for decrypting the message, and an interface 336 for displaying the message. After step 316, user B 318 can read the e-mail that was sent to him by user A 302.

Figure 4:
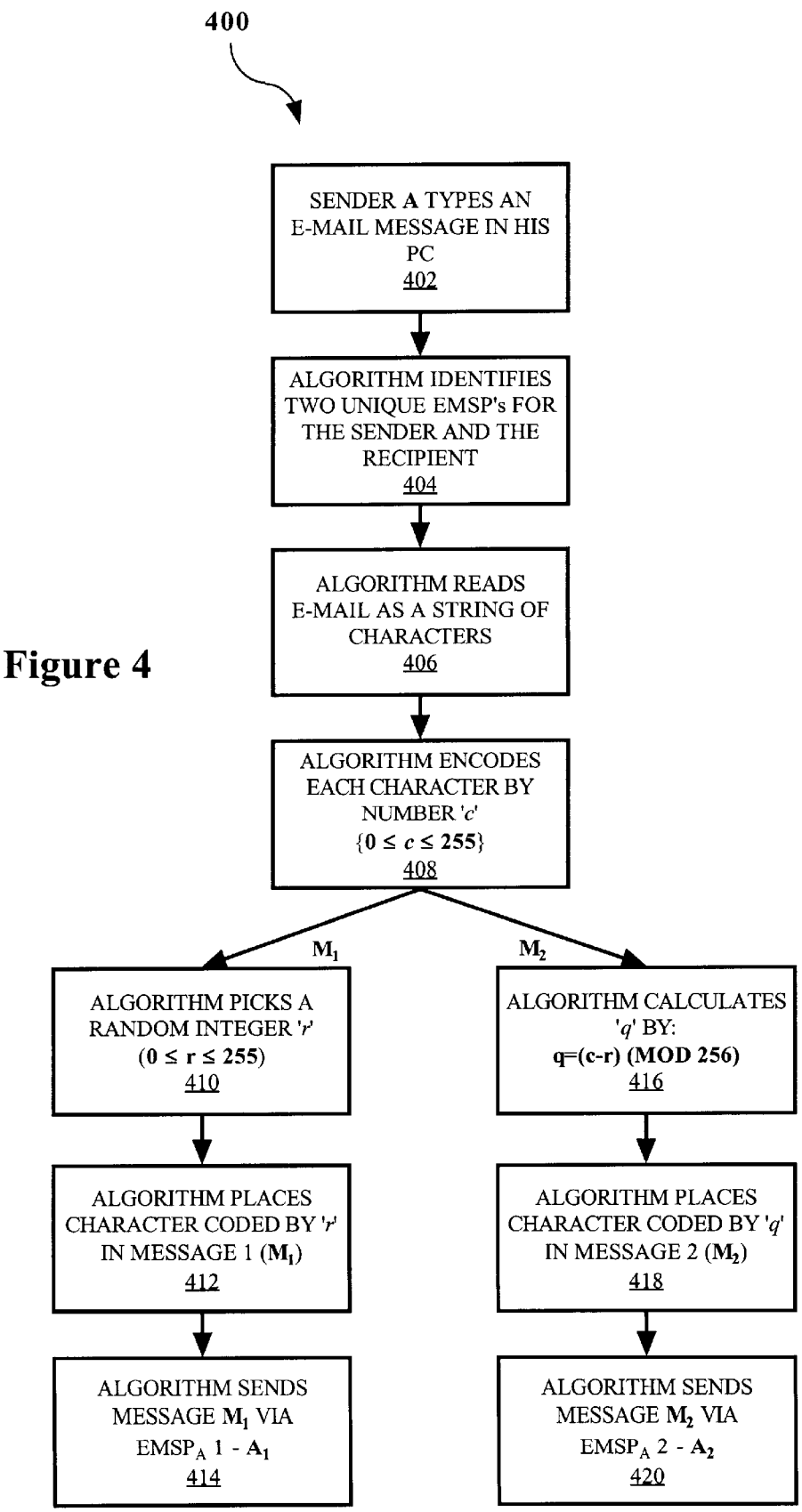
FIG. 4 illustrates a flowchart for sending secure e-mail in the system in FIG. 3.

A flow chart 400 of one embodiment of message splitting/sending method of the system described in FIG. 3 is shown in FIG. 4. In step 402, the sender types in the e-mail message in his PC and the algorithm identifies two unique EMSP's 404 associated with each the user and the recipient. The algorithm reads the body of the e-mail message as a string of characters 406, each encoded as an integer 'c' 408 whose value lies between 0 and 255. The message (represented by characters) is encoded and split into two, one character at a time. The current character in the original message is encoded by the by number c ($0 \leq c \leq 255$) and the algorithm picks a random integer 'r' between 0 and 255 410 and calculates q=(c−r)(MOD 256) 416. The system then places the character whose code is r in message $M_1$ 412 and the character whose code is q in message $M_2$ 418. As a next step, the algorithm sends $M_1$, and $M_2$ via $EMSP_A$ 1 414 and $EMSP_A$ 2 420 respectively.

Given any value of c, the conditional distribution of q is uniform, p(q/c)=¹⁄₂₅₆, and, by definition, the distribution of r is also uniform, p(r)=¹⁄₂₅₆. It follows, that the distribution of q is uniform, p(q)=¹⁄₂₅₆. So, given any value of q, the conditional distribution of c is the same as the unconditional distribution of c, i.e., $$p(c \mid q) = \frac{p(q \mid c)p(c)}{p(q)} = p(c)$$

Also, given any value of r, the conditional distribution of c is the same as the unconditional distribution of c. Thus, knowledge of either r or q alone does not change the state of knowledge about c, whereas knowledge of both, reveals c.

Figure 5:
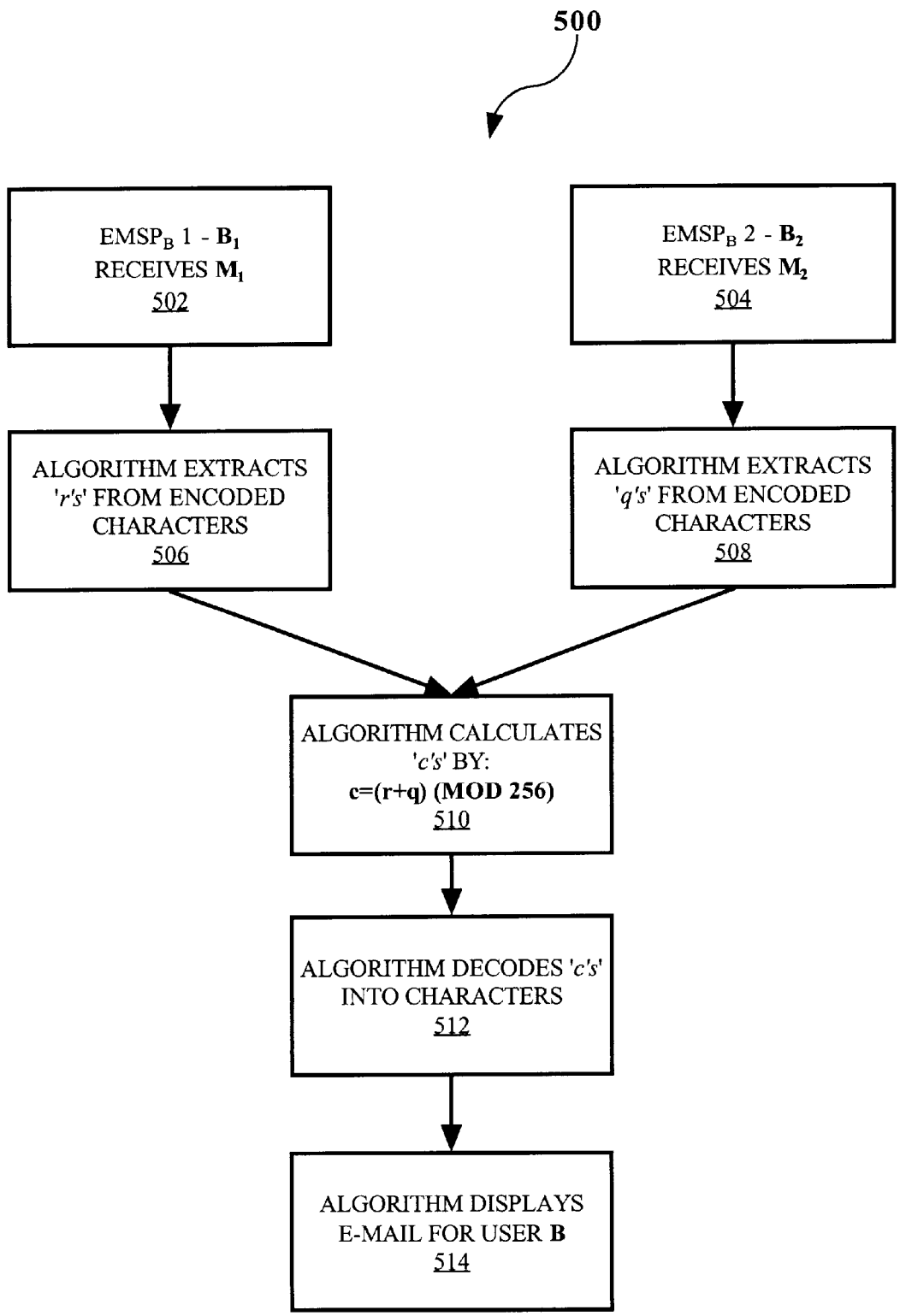
FIG. 5 illustrates a flowchart for receiving secure e-mail in the system in FIG. 3.

FIG. 5 illustrates a flowchart for receiving secure e-mail 500 as described by the system shown in FIG. 3. At the receiving end, after getting messages $M_1$ 502 and $M_2$ 504, the algorithm extracts r's (from $M_1$) 506 and q's (from $M_2$) 508 from the encoded characters. Then, the system analyzes the messages received in all the e-mail accounts of the user and matches them either based on a code word given in the subject of messages to be matched, or by analyzing the resulting re-combined text. One possible convention is that the re-combined message must begin with some standard string, so this would identify which messages should be matched. The first step in reconstruction algorithm is to calculate the value of c from the values of r and q by using: c=(r+q)(MOD 256) 510. Next, the algorithm decodes c's into characters 512 and displays the message to the user (user B in this example) 514. The reconstruction is carried out on the receiver's private machine, so none of the IPS or the EMSPs can see the original message unless they collude. The example described above can also be easily extended to multi-way message splitting.

Figure 6:
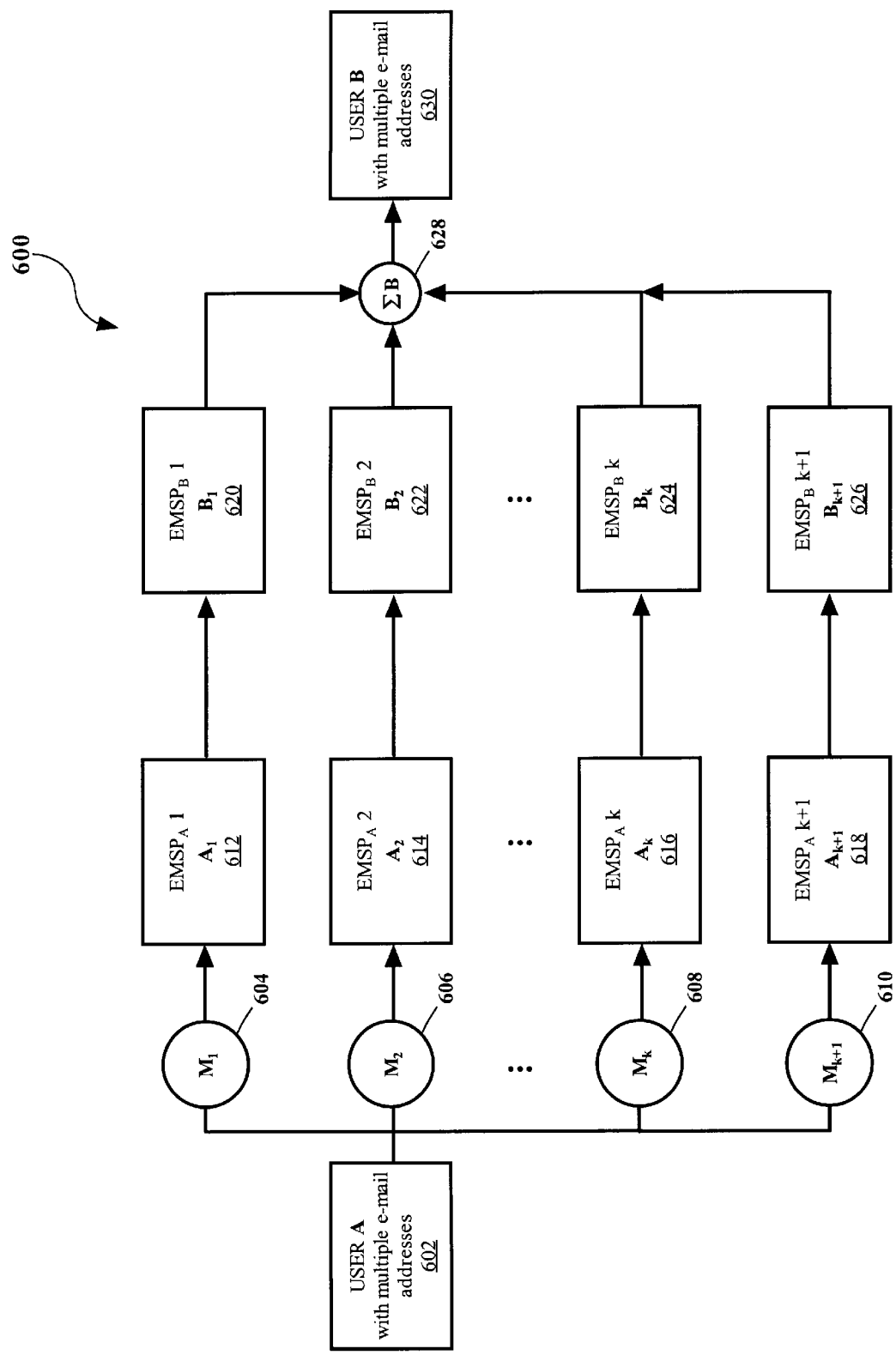
FIG. 6 illustrates an alternative embodiment of the present invention's architecture for sending/receiving secure e-mail by message splitting.

FIG. 6 describes a multi-way message splitting system 600. The system, resident in user A's 602 PC, splits the outgoing e-mail message into k+1 pieces, $M_1$ 604, $M_2$ 606, ..., $M_k$ 608, and $M_{k+1}$ 610. The system then sends the k+1 e-mail messages, message $M_1$ 604 from $A_1$ 612 to $B_1$ 620, message $M_2$ 606 from $A_2$ 614 to $B_2$ 622, message $M_k$ 608 from $A_k$ 616 to $B_k$ 624, and message $M_{k+1}$ 610 from $A_{k+1}$ 618 to $B_{k+1}$ 626. Each individual message fails to logical sense unless it is combined with other fragments via the receiver B 630. After step 628, user B 630 can read the e-mail that was sent by user A 602.

Figure 7:
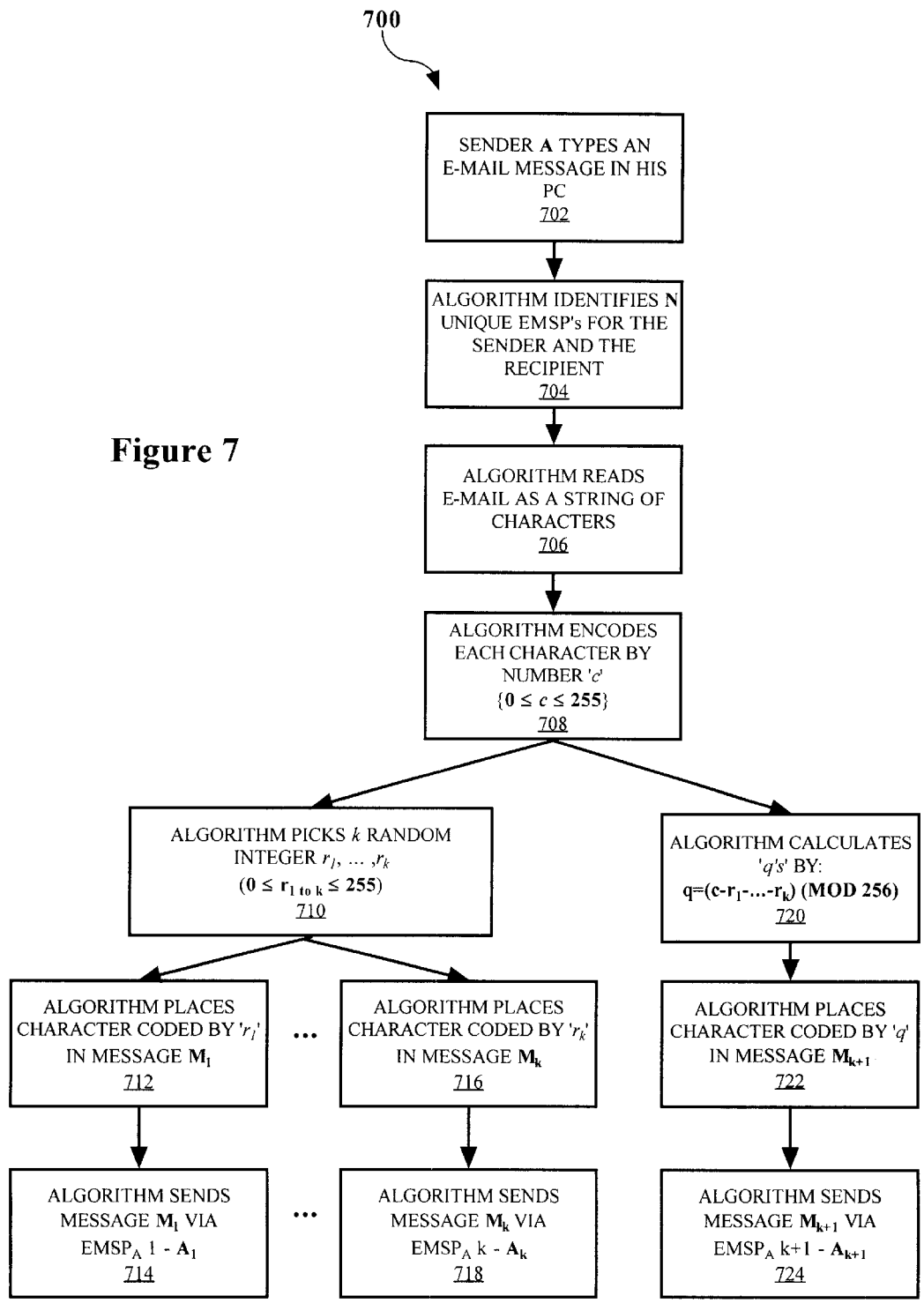
FIG. 7 illustrates a flowchart for sending secure e-mail.

A flow chart 700 of the message splitting/sending aspect of the system described in FIG. 6 is shown in FIG. 7. In step 702, the sender types in the e-mail message and the algorithm identifies k+1 unique EMSP's 704 associated with the user and the recipient. The algorithm reads in the body of the e-mail message as a string of characters 706, each encoded as an integer 'c' 708 whose value lies between 0 and 255. The message (represented by characters) is encoded and split into k+1, one character at a time. If the current character in the original message is encoded by the by number c ($0 \leq c \leq 255$), then the algorithm picks k random integer $r_1, \ldots, r_k$ value of each between 0 and 255 710 and calculates $q=(c-r_1- \ldots -r_k)(MOD\ 256)$ 416. The system then places the character whose code is $r_1$, in message $M_1$, 712, ..., $r_k$ in message $M_k$ 716, and the character whose code is q in message $M_{k+1}$ 722. As a next step, the algorithm sends $M_1, \ldots, M_k$ and $M_{k+1}$ via $EMSP_A$ 1 714, ..., $EMSP_A$k 718, and $EMSP_A$k+1 724 respectively.

Figure 8:
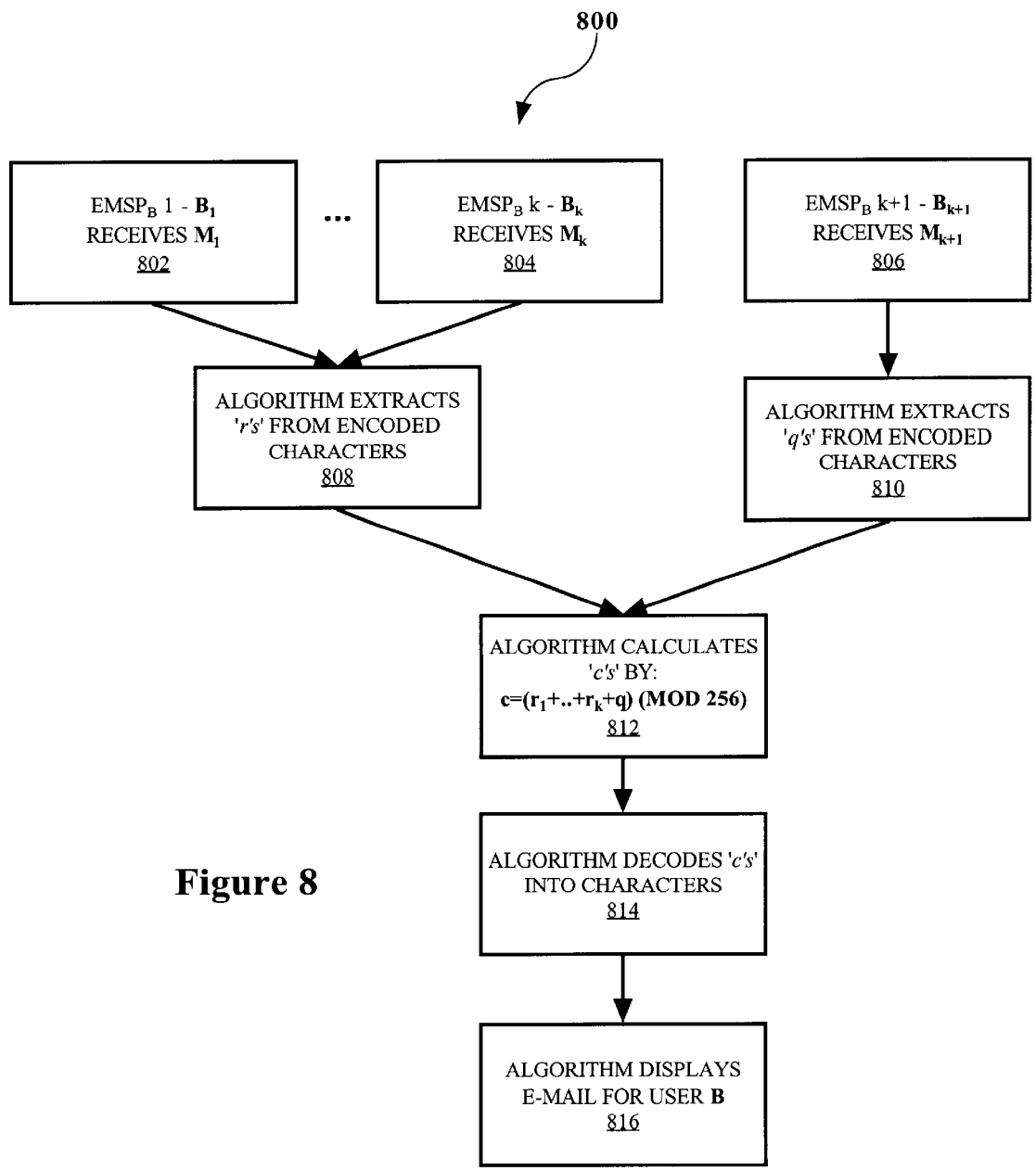
FIG. 8 illustrates a flowchart for receiving secure e-mail.

FIG. 8 illustrates a flowchart for receiving secure e-mail 800 as described by the system shown in FIG. 6. At the receiving end, after getting messages $M_1$ 802, ..., $M_k$ 804, and $M_{k+1}$ 806, the algorithm extracts r's (from $M_1, \ldots, M_k$) 808 and q's (from $M_{k+1}$) 810 from the encoded characters. Then, the system analyzes the messages received in all the e-mail accounts of the user and matches them either based on a code word given in the subject of messages to be matched, or by analyzing the resulting re-combined text. One possible convention is that the re-combined message must begin with some standard string, so this would identify which messages should be matched. The first step in reconstruction algorithm is to calculate the value of c from the values of r's and q's by using: $c = (q+r_1+ \ldots +r_k)(MOD\ 256)$ 812. Next, the algorithm decodes c's into characters 814 and displays the message to the user (user B in this example) 816. The reconstruction is carried out on the receiver's private machine, so none of the IPS or the EMSPs can see the original message unless they collude.

Hence, the current system provides for a method and system that reduces the chances an intruder can compromise the encryption codes and read another user's e-mail.

It should also be noted that while the components discussed above are discrete components, the real world implementation of the present invention may provide for any given functional component to have all or portions of other functional components incorporated therein, as is well understood, due to the mutable nature of a software implementation of the present invention. In addition the present invention may be implemented completely in software, a combination of software and hardware, or completely in hardware, however, a software implementation is preferred.

The above system and its described functional elements are implemented in various computing environments. For example, the present invention may be implemented on a conventional IBM PC or equivalent, multi-nodal system (e.g. LAN) or networking system (e.g. Internet, WWW). All programming and data related thereto are stored in computer memory, static or dynamic, and may be retrieved by the user in any of: conventional computer storage (local or remote), display (i.e. CRT) and/or hardcopy (i.e. printed) formats. The programming of the present invention may be implemented by one of skill in electronic messaging and security.

CONCLUSION

A system and method has been shown in the above embodiments for the effective implementation of a system for securing electronic mail. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware. In addition, the specific chosen methods of splitting e-mail messages are representative of the preferred embodiment and should not be limited by e-mail systems, encryption schemes, number of EMSP's used, number of splitting operations, location of software code, use of internal or remote e-mail systems, type or content of e-mail (i.e., video, audio, text).

What is claimed is:

1. A method of providing secure e-mail transmissions comprising:

receiving entered textual message(s);

identifying at least two unique e-mail domains associated with each of a sender and a recipient;

splitting the message into at least two fragments;

connecting to said at least two unique e-mail service providers;

forwarding each of the message fragments via a separate one of said unique e-mail service providers;

receiving said message fragments from all the identified unique e-mail service providers;

recombining the received message fragments, and displaying the recombined message to the recipient.

2. A method for providing secure e-mail transmissions as per claim 1, wherein said method is performed remote from said at least two unique e-mail providers.

3. A method for providing secure e-mail transmissions as per claim 1, wherein the message is split into three or more unique fragments.

4. A method for providing secure e-mail transmissions as per claim 1, wherein the message is sent via three or more unique e-mail service providers.

5. A method for providing secure e-mail transmissions as per claim 1, wherein said combining step further comprises analyzing and matching the received message fragments.

6. A method for providing secure e-mail transmissions as per claim 5, wherein said analyzing and matching of said message fragments is based on a code word given in a subject of messages to be matched.

7. A method for providing secure e-mail transmissions as per claim 5, wherein said analyzing and matching of said message fragments is based on analyzing various resulting re-combined texts.

8. A method for providing secure e-mail transmissions as per claim 1, wherein said means for connecting to e-mail service providers is accomplished via LANs, WANs, cellular, Internet, or Web-based networks.

9. A method for providing secure e-mail transmissions as per claim 1, wherein said recombined message is displayed via a graphical user interface shown in an CRT, monitor or television.

10. A method for providing secure e-mail transmissions as per claim 1, wherein said method further comprises of encrypting the message prior to the step of splitting.

11. A method for providing secure e-mail transmissions as per claim 1, wherein said step of recombining the received message fragments further comprises of decrypting the recombined message.

12. A system of providing secure e-mail transmissions comprising:
- a first interface, said interface receiving entered textual message(s);
- an identifier, identifying at least two unique e-mail domains associated with each of a sender and a recipient;
- a splitter, said splitter receiving said encrypted message and splitting the encrypted message into at least two fragments;
- a sender, said sender sending said message fragments to a receiver via a separate one of said identified unique providers, said receiver receiving said message fragments from all the identified unique e-mail service providers;
- a recombiner, combining the received message fragments; and
- a second interface, displaying the recombined message.

13. A system of providing secure e-mail transmissions as per claim 12, wherein said system further comprises:
- an encryptor, said encryptor encrypting the message received via said first interface, and a decryptor, decrypting the recombined message.

14. A method for providing secure e-mail transmissions comprising the steps of:
- receiving entered textual message(s) as a string of characters;
- encoding each of said characters with an integer, c, whose numerical value is between 0 and 255;
- picking k random integers $r1, \ldots, rk$ whose numerical values are between 0 and 255;
- placing characters coded by r1 through rk in message fragments M1 through Mk respectively;
- sending message fragments M1 through Mk via e-mail service providers EMSPA1 through EMSPAk;
- calculating a q's by $q=(c-r1- \ldots -rk)(\text{MOD } 256)$;
- placing characters coded by g's in said value q in a message fragment Mk+1; and
- sending message fragment Mk+1 via e-mail service provider EMSPAk+1.

15. A method for providing secure e-mail transmissions as per claim 14, wherein said method further comprises the steps of:
- receiving message fragments M1 through Mk via e-mail service providers EMSPB1 through EMSPBk;
- extracting r's from message fragments M1 through Mk;
- receiving message fragment Mk+1 through e-mail service provider EMSPBk+1;
- extracting q's from encoded characters;
- calculating c's by $c=(r1+ \ldots +rk+q) (\text{MOD } 256)$;
- decoding c's into characters, and
- reconstructing e-mail message from said decoded characters.

16. An article of manufacture comprising a computer user medium having computer readable code embodied therein which secures electronic mail, said system comprising:
- computer readable program code receiving entered textual message;
- computer readable program code identifying at least two unique e-mail domains associated with each the sender and the recipient;
- computer readable program code encrypting the message;
- computer readable program code splitting the encrypted message into at least two fragments;
- computer readable program code connecting to at least two unique e-mail service providers;
- computer readable program code forwarding each of the message fragments via a separate one of said unique e-mail service providers;
- computer readable program code receiving message fragments from all the identified e-mail service providers;
- computer readable program code analyzing and matching the received message fragments;
- computer readable program code combining the matched message fragments;
- computer readable program code decrypting the combined message, and
- computer readable program code displaying the decrypted message.

17. An article of manufacture comprising a computer user medium having computer readable code embodied therein which secures e-mail transmissions, said medium comprising:
- computer readable program receiving entered textual message(s) as a string of characters;
- computer readable program code encoding each of said characters with an integer, c, whose numerical value is between 0 and 255;
- computer readable program code picking k random integers $r1, \ldots, rk$ whose numerical values are between 0 and 255;
- computer readable program code placing characters coded by r1 through rk in message fragments M1 through Mk respectively;
- computer readable program code sending message fragments M1 through Mk via e-mail service providers EMSPA1 through EMSPAk;
- computer readable program code calculating q's by $q=(c-r1- \ldots -rk)(\text{MOD } 256)$;
- computer readable program code placing characters coded by q's in said value q in a message fragment Mk+1; and
- computer readable program code sending message fragment Mk+1 via e-mail service provider EMSPAk+1.

18. An article of manufacture comprising a computer user medium having computer readable code embodied therein which secures e-mail transmissions as per claim 14, wherein said medium further comprises:

computer readable program code receiving message fragments M1 through Mk via e-mail service providers EMSPB1 through EMSPBk;

computer readable program code extracting r's from message fragments M1 through Mk;

computer readable program code receiving message fragment Mk+1 through e-mail service provider EMSPBk+1;

computer readable program code extracting q's from encoded characters;

computer readable program code calculating c's by c=(r1+ . . . +rk+q) (MOD 256);

computer readable program code decoding c's into characters, and computer readable program code reconstructing e-mail message from said decoded characters.

* * * * *